(12) United States Patent
Neilan

(10) Patent No.: US 8,966,505 B1
(45) Date of Patent: Feb. 24, 2015

(54) EVENT HANDLING

(71) Applicant: NCR Corporation, Duluth, GA (US)

(72) Inventor: Michael James Neilan, Dundee (GB)

(73) Assignee: NCR Corporation, Duluth, GA (US)

(*) Notice: Subject to any disclaimer, the term of this patent is extended or adjusted under 35 U.S.C. 154(b) by 0 days.

(21) Appl. No.: 13/960,190

(22) Filed: Aug. 6, 2013

(51) Int. Cl.
G06F 9/44 (2006.01)
G06Q 40/00 (2012.01)
G06F 9/54 (2006.01)

(52) U.S. Cl.
CPC ............................ *G06F 9/542* (2013.01)
USPC ............................ 719/318; 235/379; 705/43

(58) Field of Classification Search
None
See application file for complete search history.

(56) References Cited

U.S. PATENT DOCUMENTS

| 4,621,326 | A  | * | 11/1986 | Rawlins ........................ 705/43 |
| 7,568,027 | B2 | * | 7/2009  | Becker et al. ................ 709/224 |
| 7,747,527 | B1 | * | 6/2010  | Korala ............................ 705/43 |
| 8,078,912 | B2 | * | 12/2011 | Neilan et al. .................... 714/22 |
| 2006/0179042 | A1 | * | 8/2006 | Bram et al. ....................... 707/3 |
| 2009/0083182 | A1 | * | 3/2009 | Coventry et al. ............... 705/43 |
| 2009/0204856 | A1 | * | 8/2009 | Sinclair et al. ................. 714/48 |
| 2009/0212105 | A1 | * | 8/2009 | Couper et al. ................. 235/379 |
| 2010/0161343 | A1 | * | 6/2010 | Kennedy et al. ............... 705/1.1 |
| 2010/0281155 | A1 | * | 11/2010 | Cipollone et al. ............ 709/224 |
| 2012/0023028 | A1 | * | 1/2012 | McDade et al. .............. 705/305 |

* cited by examiner

*Primary Examiner* — Charles E Anya
(74) *Attorney, Agent, or Firm* — Joseph P. Mehrle

(57) ABSTRACT

A method of handling events is described. The method comprises: receiving an event; transmitting the event to a remote management application; receiving a new event; ascertaining if the new event fulfills an event storm criterion; suppressing the new event if the new event fulfills the event storm criterion; and transmitting the new event to the remote management application if the new event does not fulfill the event storm criterion.

4 Claims, 4 Drawing Sheets

EVENT HANDLING

FIELD OF INVENTION

The present invention relates to event handling. In particular, although not exclusively, the invention relates to event handling at a self-service terminal (SST).

BACKGROUND OF INVENTION

SSTs, such as automated teller machines (ATMs), generate events to inform a management application of a change in state of a device or software in the SST. This allows the management application to monitor the status of the ATM. This also allows the management application to ascertain if the ATM requires, or will soon require, intervention, for example, from a technician, a media replenisher (receipt paper or cash), or the like.

Some events are generated through normal operation of the ATM (such events include cash low events, receipt paper low events, information events, and transaction-related events). Other events are generated when an authorised person opens the ATM (such as interlock events when a device is racked out to clear a jam, or replace a part on the device, when a supervisor mode is entered). Other events occur when an exception occurs during operation. Examples of these exceptions are software exceptions (memory leaks, stack overflows, and the like) and hardware exceptions (banknote pick failures, print failures, and the like).

Events are typically conveyed by a software management agent resident on the ATM to a remote management application. It is known for such software management agents to filter out certain events because they are expected during normal operation or routine maintenance (for example, an interlock event to indicate that a currency dispenser is racked out).

However, sometimes a device fails and generates a very large number of events. For example, the same event may be generated thousands of times each second. This can lead to the management application being swamped with these events so that network traffic is disrupted. However, it is not desirable to filter out these events because the management application has to know about them.

SUMMARY OF INVENTION

Accordingly, the invention generally provides methods, systems, apparatus, and software for handling events.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a method of handling events, the method comprising: receiving an event; transmitting the event to a remote management application; receiving a new event; ascertaining if the new event fulfils an event storm criterion; suppressing the new event if the new event fulfils the event storm criterion; transmitting the new event to the remote management application if the new event does not fulfil the event storm criterion.

The new event may fulfil the event storm criterion if the new event matches an event received during a defined event storm time period.

The event storm time period may comprise a defined time prior to the receipt of the new event. The event storm time period may be of the order of milliseconds, seconds, or minutes. For example, the event storm time period may comprise ten seconds. If a new event is received, and this new event matches an event received within this time period (for example, ten seconds) measured back from the new event, then the new event is suppressed and not sent to the management application. This means that the event storm time period is measured back from each new event so that matching events may be blocked for several hours if each new event is received within the event storm time period of the previous matching event.

This has the advantage that the first such event is transmitted so that the management application is notified of the event, but frequent repeated occurrences of this event are not transmitted, so there is no problem with swamping the management application or consuming network bandwidth.

Alternatively, the new event may fulfil the event storm criterion if the new event matches a defined number of events (for example, ten, twenty, or the like) received during the event storm time period.

This has the advantage that a management application receives a number of the events before the events are suppressed, thereby ensuring that the management application is made aware that an event storm is in progress.

The method may comprise the further step of recording a count of the number of matching events that have been suppressed.

The method may comprise the further step of transmitting an event clear message relating to the matching event, if no matching event is received during a defined normal operation time period.

The defined normal operation time period may be of the order of minutes or hours. For example, if no repeated event is received for three hours then an event clear message may be transmitted. The event clear message may include details of the event that was suppressed and the number of occurrences of that event that were suppressed.

The method may comprise the further step of generating an event indicating that an event storm is being suppressed and transmitting that generated event to the management application.

According to a second aspect there is provided a self-service terminal including (i) a plurality of managed devices and (ii) a management agent executing on the terminal, wherein the management agent is operable to: receive an event from one of the managed devices; transmit the event to a remote management application; receive a new event; ascertain if the new event fulfils an event storm criterion; suppress the new event if the new event fulfils the event storm criterion; transmit the new event to the remote management application if the new event does not fulfil the event storm criterion.

The management agent may be operable to ascertain if the new event fulfils an event storm criterion by ascertaining if the new event matches an event received during a defined event storm time period.

When the management agent ascertains if the new event matches an event received during a defined event storm time period, the management agent may verify that (i) the same managed device generated the new event and the event received during the defined event storm period, and (ii) the new event is the same type as the event received during the defined event storm period.

The management agent may comprise: and agent core, a plurality of collector components, and a transfer service.

The agent core may comprise: an agent configuration component; a rules engine component; a scheduling component; and an event filtering component.

A collector component may be associated with each of the managed devices. A collector component may be associated with multiple managed devices (for example, an inventory collector component may be associated with multiple devices so that it can create a list of the managed devices that are present) or only one managed device. Each collector component may be operable to collect information from one or more managed devices with which that collector is associated. Multiple collectors may be associated with the same managed device; for example, a WMI (Windows Management Instrumentation) collector may be associated with a WMI service, and an inventory collector may also be associated with the WMI service.

The agent configuration component may be used to configure how the management agent operates with respect to filtering events, scheduling information collection from the managed devices, and the like.

The rules engine component may be operable to decide how an event should be handled based on how the rules engine is configured.

The scheduling component may include details (programmed using the agent configuration component) about when information should be retrieved from the collectors associated with the managed devices and/or transmitted to the remote management application.

The event filtering component uses the rules engine to ascertain which events will be filtered (that is, not transmitted to the management application).

The rules engine component may also be used to define the event storm time period and the normal operation time period.

The transfer service component may be used to facilitate communications between the remote management application and the agent core.

The transfer service component may implement a known communications technology. For example, the transfer service may implement simple network management protocol (SNMP), Web services, a Background Intelligent Transfer Service (BITS), or the like.

The transfer service component may be operable to assign a unique sequence number to each event that is transmitted to the remote management application.

The transfer service component may buffer received events in the event of a communications failure, and may transmit those events when the communications failure is resolved.

The self-service terminal may comprise an automated teller machine, a self-checkout terminal, a payment terminal, or the like.

According to a third aspect there is provided a management agent for executing on a terminal comprising a plurality of managed devices, wherein the management agent is programmed to: (i) receive an event from one of the managed devices; (ii) transmit the event to the management application; (iii) receive a new event; (iv) ascertain if the new event fulfils an event storm criterion; (v) suppress the event if the new event fulfils the event storm criterion; and (vi) transmit the event to the remote management application if the new event does not fulfil the event storm criterion.

The management agent may be programmed to implement step (iv) by ascertaining if the new event matches an event received during a defined event storm time period.

The management agent may be further programmed, as part of step (iv), to verify that (a) the same managed device generated the new event and the event received during the defined event storm period, and (b) the new event is the same type as the event received during the defined event storm period.

The management agent may comprise: an agent configuration component; a rules engine component; a scheduling component; and an event filtering component.

The rules engine component may also be used to define the event storm time period and the normal operation time period.

According to a fourth aspect there is provided a system comprising a terminal including a plurality of managed devices, a management agent executing on the terminal, and a management application executing on a remote server, wherein the management agent is operable to: receive an event from one of the managed devices; transmit the event to the management application; receive a new event; ascertain if the new event matches an event received during a defined event storm time period; suppress the event if there is a match within the defined event storm time period; transmit the event to the remote management application if there is no match within the defined event storm time period.

According to a fifth aspect there is provided a management agent for executing on a terminal comprising a plurality of managed devices, wherein the management agent is programmed to: (i) receive an event from one of the managed devices; (ii) ascertain if the event fulfils an event storm criterion; (iii) suppress the event if the event fulfils the event storm criterion; and (iv) transmit the event to a remote management application if the event does not fulfil the event storm criterion.

For clarity and simplicity of description, not all combinations of elements provided in the aspects recited above have been set forth expressly. Notwithstanding this, the skilled person will directly and unambiguously recognise that unless it is not technically possible, or it is explicitly stated to the contrary, the consistory clauses referring to one aspect are intended to apply mutatis mutandis as optional features of every other aspect to which those consistory clauses could possibly relate.

These and other aspects will be apparent from the following specific description, given by way of example, with reference to the accompanying drawings.

DETAILED DESCRIPTION

Figure 1:
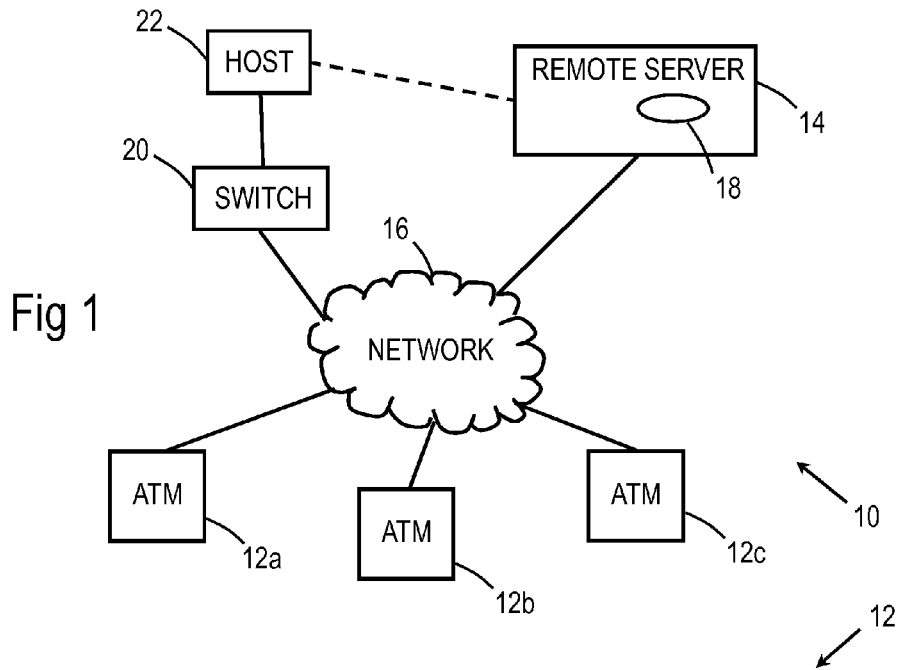
FIG. 1 is a simplified block diagram illustrating a system for handling events according to one embodiment of the present invention.

Reference is first made to FIG. 1, which is a block diagram illustrating a system 10 for handling events according to one embodiment of the present invention.

The system 10 comprises a plurality of self-service terminals 12 (only three of which are illustrated in FIG. 1) in the form of automated teller machines (ATMs) coupled to a remote management server 14 by an Internet Protocol (IP) network 16. A management application 18 executes on the remote management server 14 and is used to monitor the status and performance of the ATMs 12 in the system 10, and to schedule maintenance and replenishment operations for these ATMs 12.

The system 10 also comprises a conventional transaction switch 20 and an authorization server 22. As is known in the art, the transaction switch 20 is used to route transactions requested by a customer at one of the ATMs to a financial institution that maintains an account for that customer. For any transactions requested by customers of the owner of the system 10 (referred to as "on-us" transactions), the authorization server 22 provides the authorization approval or denial. For other transactions ("not-on-us" transactions) the transaction switch 20 routes the transaction request to an appropriate interchange network for approval.

Figure 2:
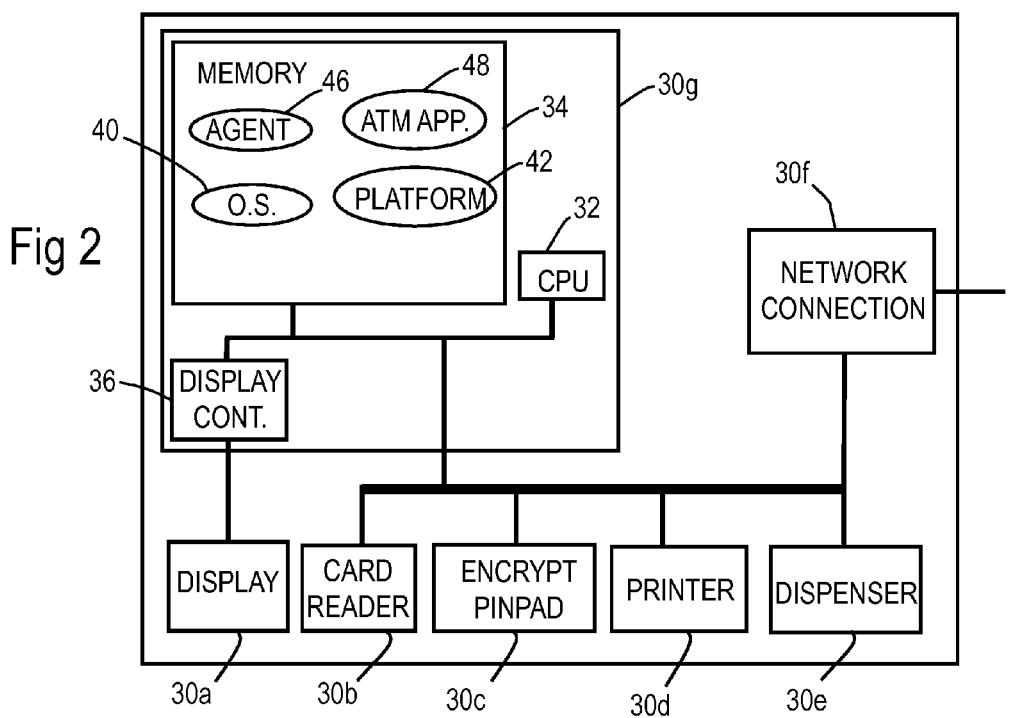
FIG. 2 is a simplified block diagram illustrating a terminal (an ATM) of the system of FIG. 1 in more detail.

Reference is now also made to FIG. 2, which is a simplified block diagram illustrating one of the ATMs 12 of FIG. 1 in more detail.

Each ATM 12 includes a plurality of managed devices 30. As used herein, the phrase "managed device" has a broad meaning that encompasses software components, hardware components, and combined software and hardware components.

The managed devices include: a customer display 30a, a card reader device 30b; an encrypting PIN pad 30c; a receipt printer device 30d; a cash dispenser device 30e; a network device 30f for connecting to the IP network 16; and a controller device 30g (in the form of a PC core) for controlling the operation of the ATM 12, including the operation of other managed devices (not shown for simplicity of description).

The controller 30g comprises a microprocessor 32, associated main memory 34, and a display controller 36 in the form of a graphics card.

During operation of the ATM 12, various software components are loaded into, and execute in, the memory 34. These components include a conventional operating system 40 (in this embodiment a Microsoft (trade mark) XP (trade mark) operating system), platform components 42 for enhancing and extending the operating system for non-standard devices (such as the cash dispenser 30e, encrypting PINpad 30c, and the like), a distributed management agent 46, and an ATM application 48.

As is known in the art, the ATM application 48 controls the operation of the ATM 12 to allow customers to execute transactions, and to allow authorized personnel to service the ATM 12 (including maintaining the ATM 12, diagnosing faults in the ATM 12, and replenishing the ATM 12). In this embodiment, the ATM application 48 is a conventional (unmodified) XFS-compliant ATM application.

Figure 3:
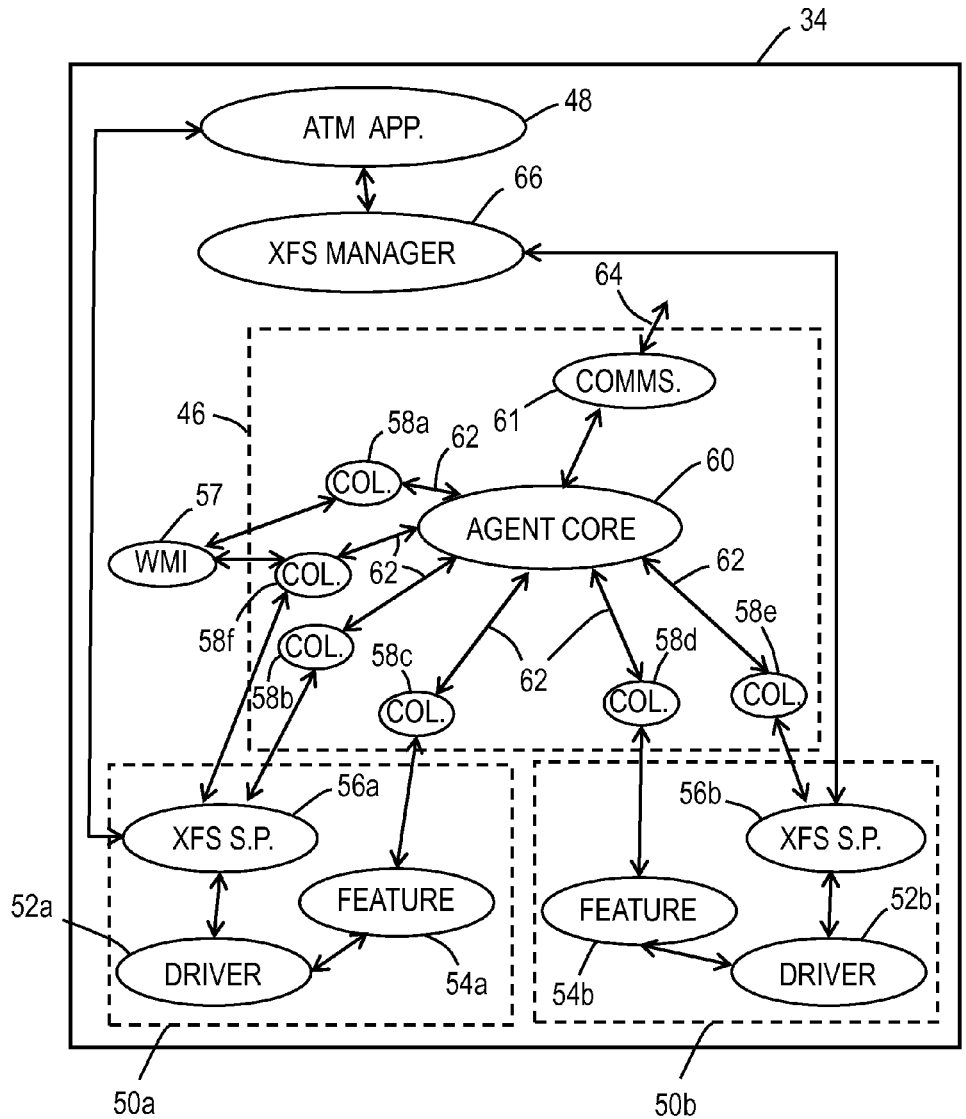
FIG. 3 is a simplified block diagram illustrating software components executing in a memory of the ATM of FIG. 2.

Reference will now also be made to FIG. 3, which is a simplified block diagram illustrating in more detail some of the software components executing in the memory 34 during operation of the ATM 12.

The combination of the operating system 40 and platform components 42 provide, for each managed device 30, a component stack 50 (two of which are illustrated in FIG. 3) comprising: driver software 52, feature software 54, and an XFS service provider 56.

As is known in the art, the driver software 52 implements the low-level commands to control the device in response to standard CEN commands received via the XFS service provider 56 for that device. As is known in the art, CEN is the European Committee for Standardization, and XFS is the eXtensions for Financial Services standard.

The feature software 54 and the XFS service provider 56 both expose information (such as log and tally files), events (such as a change of status of the managed device, or an error condition), and commands (such as diagnostic functions, self-test routines, and the like).

The operating system 40 includes a WMI (Windows Management Instrumentation) service 57 that provides management information about various devices (including other components in the operating system, such as the registry) within the ATM 12.

The management agent 46 includes various collector components 58 (only six of which are shown). Each collector component 58 is associated with at least one managed device (which may be a software component such as the XFS service provider 56 and the feature software 54, the WMI service 57, or the like). One of the collector components 58f (an inventory component) is associated with multiple managed devices, but is only illustrated in FIG. 3 as being coupled to the XFS service provider 56a and the WMI service 57.

The management agent 46 also comprises an agent core 60 that communicates with all of the collector components 58.

The management agent 46 also includes a transfer service component 61 that manages communication between the agent core 60 and the management application 18 (FIG. 1). The transfer service component 61 assigns a unique sequence number to each event that is transmitted to the management application 18. If communications with the management application 18 are disrupted, then the transfer service component 61 buffers received events until the communications disruption is resolved, then the transfer service component 61 relays those buffered events to the management application 18.

The combination of the agent core 60, the various collector components 58, and the transfer service component 61 comprise the management agent 46.

The agent core 60 communicates directly with the various collector components 58 across a proprietary interface (illustrated by arrows 62 in FIG. 3). The agent core 60 also communicates with the management application 18 executing on the remote server 14 (FIG. 1) via the transfer service component 61 (illustrated by arrow 64 in FIG. 3).

An XFS manager 66 executes in the memory 34 and communicates with the various XFS service providers 56 to convey commands to the managed devices 30 (some of which are received from the ATM application 48) and to receive responses and other information from these managed devices 30.

Figure 4:
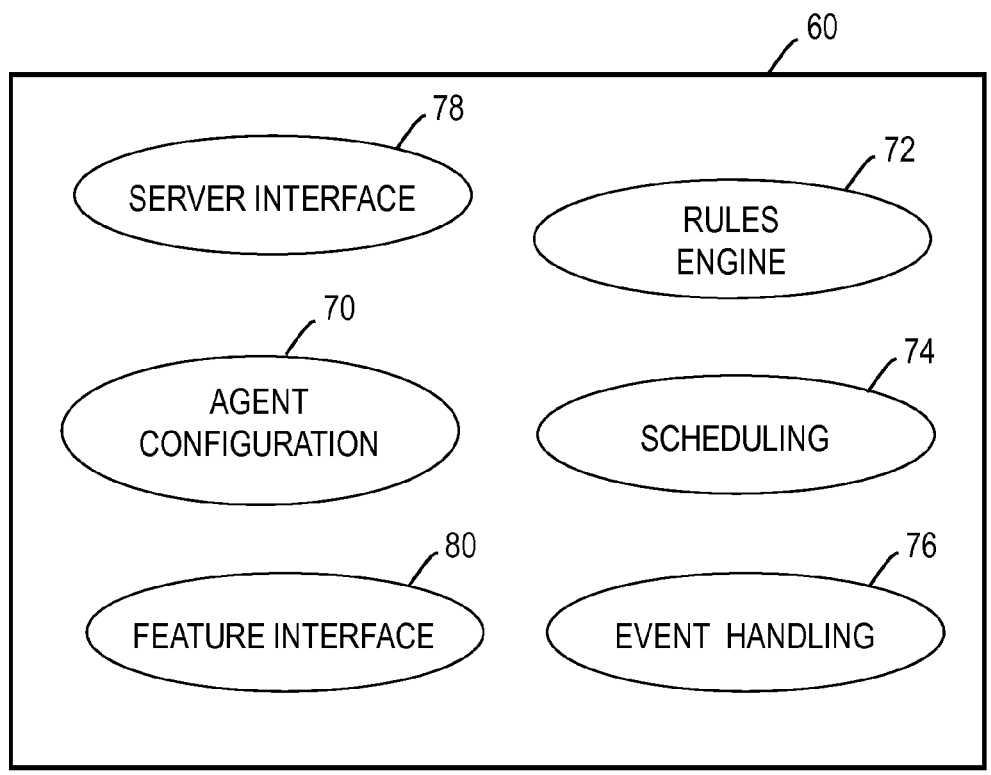
FIG. 4 is a simplified block diagram illustrating one of the software components shown in FIG. 3 (an agent core) in more detail.

Reference will now also be made to FIG. 4, which is a simplified block diagram illustrating the agent core 60 in more detail.

The agent core 60 comprises an agent configuration component 70, a rules engine 72; a scheduling function 74, an event handling function 76, a management server interface 78, and a collector interface 80.

The agent configuration component 70, as its name suggests, is used to configure the operation of the management agent 46.

The rules engine 72 is used to enable the agent core 60 to decide how to handle events it receives. These events may be solicited (that is, received in response to a request for information) or unsolicited (for example, provided when a status changes, or when an exception occurs relating to a managed device).

The scheduling function 74 is used to indicate to the agent core 60 how frequently information should be retrieved from each of the collector components 58 in the feature software 54. The schedule for collecting information may vary depending on the type of managed device 30 and the type of information being collected. Although all of the managed devices 30 illustrated in the drawings relate to hardware; some managed devices are software (for example, the XFS manager 66, the platform 42, the WMI service 61, and the ATM application 48 are all managed devices). The scheduling function 74 can be programmed by an authorized user via the agent configuration component 70.

The event handling function 76 performs two main tasks.

The first task of the event handling function 76 is to filter out (that is, to delete) any events received from feature software 54 that are identified as unwanted. Each event has an event type identifier string to indicate what type of activity gave rise to the event (for example, cash low in a currency cassette). The event type identifier may comprise multiple levels of information, for example, the event source, event properties (such as a device event type, a sub-device event type, and an event property or value).

Those unwanted event types are programmed into the rules engine 72 using the agent configuration component 70 (which may provide an authorized user with a graphical user interface to aid configuration of the agent 46). Typical unwanted events are those that relate to events that are expected to occur and are transitory, for example events occurring during maintenance operations (such as an interlock sensor changing status).

Figure 5:
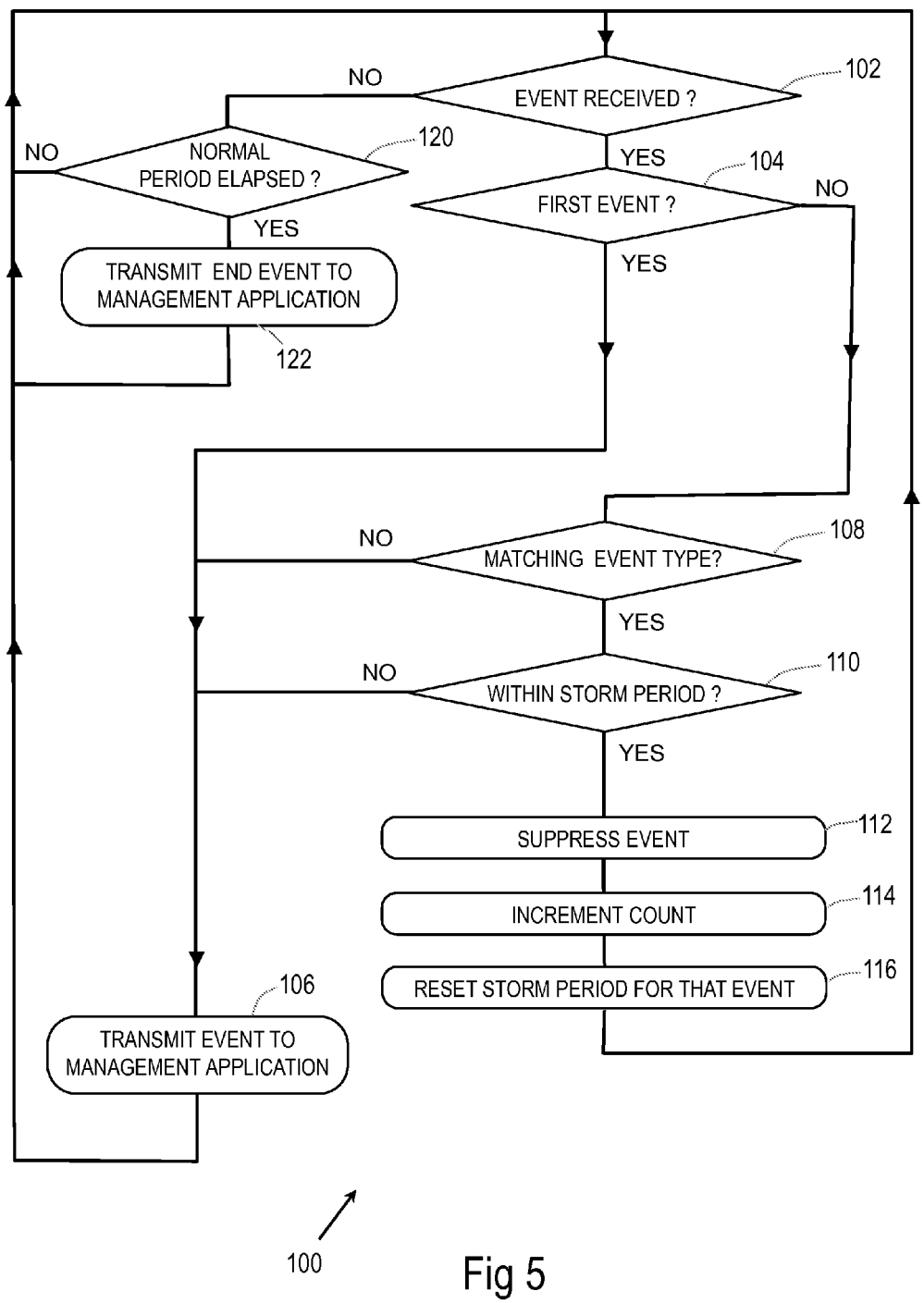
FIG. 5 is a flowchart illustrating steps performed by one of the software components (a management agent) illustrated in FIG. 3.

The second task of the event handling function 76 is to filter out any repeated events that fulfil an event storm criterion. These repeated events are typically events that the management application 18 needs to know about. However, repeated occurrences of these events might have an adverse effect on system operation, so only the first (or first few) of these events are transmitted to the management application 18, the rest are suppressed. The operation of the management agent 46 (and particularly the event handling function 76) to perform the second task (event storm suppression) will now be described with reference to FIG. 5, which is a flowchart 100 illustrating steps performed by the management agent 46.

Initially, the agent core 60 waits for an event to be received from a managed device 30 (which may be from, for example, the XFS service provider 58 or the feature software 54) via a collector component 58 and the collector interface 80 (step 102).

If an event is received, the agent core 60 ascertains if this is the first event received from the managed device 30 that generated that event (step 104).

If this is the first event received from that managed device 30, then the event handling function 76 transmits this first event to the remote management application 18 via the management server interface 78 and the transfer service component 61 (step 106).

If this is not the first event received from that managed device 30, then the event handling function 76 ascertains if this event fulfils an event storm criterion. This is implemented in the event storm suppression flow 100 by two steps (but this could be implemented as fewer or more steps, as desired).

The first of these steps is to ascertain if this event is the same type as any previously received event (step 108).

If this event is not the same type as a previously received event, then this event is transmitted to the management application 18 (step 106).

If the new event is of the same type as a previously received event, then the agent core 60 ascertains if this event has been received within an event storm time period from the most recently received previous event of the same type (and from the same managed device 30) as this event (step 110). In this example, the event storm time period is thirty seconds.

If this event is not received within the event storm time period, then this event is transmitted to the management application 18 (step 106).

If this event is received within the event storm time period, then the agent core 60 suppresses this event (in other words, it deletes this event and does not transmit it to the management application 18) (step 112).

The agent core 60 then increments a counter for that event type and management device combination (step 114). This records the number of events of that combination that have been suppressed by the event handling function 76.

The agent core 60 then resets the event storm time period for that combination of event type and managed device 30 (step 116). It should be appreciated that there may be multiple active event storm time periods; one for each combination of managed device and event type for which an event has been generated within a preceding time period corresponding to the event storm time period. The agent core 60 may also identify predefined combinations of events and suppress those combinations. Each type of event may have a different event storm time period.

The flow then returns to step 102, at which the agent core 60 awaits a new event.

If no event is received with a checking time period (for example, ten minutes) then the agent core 60 ascertains if a normal operation period has elapsed for any combinations of managed device and event type (step 120). In this example, a normal operation period is set at two hours. This means that if there has been no recurrence of an event corresponding to a combination of event type and managed device in the last two hours, then an event storm is deemed to be over.

If a normal operation period has elapsed (in other words, if more than two hours has elapsed, in this example, since the last occurrence of a particular repeated event was suppressed, and no end event has been transmitted for that event type) then the agent core 60 transmits an end event for that combination of event type and managed device 30 to the management application 18 (step 122).

The end event (also referred to as an event clear message) includes details of the event type, the managed device 30 that generated that event type, and the number of events that were suppressed during the event storm.

It should now be appreciated that this embodiment has the advantage of notifying the management application 18 of an event without swamping the management application 18 with repeated occurrences of that event.

Although some software described herein is referred to as a component, and other software is referred to as a function, it should be appreciated that such software may be implemented in any convenient form, including as routines, objects, methods, procedures, libraries, or the like, and references in these embodiments to software as components is not intended to restrict the embodiments to any particular form of code.

Various modifications may be made to the above described embodiment within the scope of the invention, for example, in other embodiments, self-service terminals other than ATMs, or networks other than SSTs, may be used to implement the event handling function.

In other embodiments, the system 10 may not implement the CEN XFS standard; proprietary commands may be used instead. In other embodiments, such as embodiments in a retail environment, the OPOS standard may be used.

The various time periods specified in the above embodiment are given merely by way of example. Different time periods may be selected depending on the characteristics of the system, network bandwidth, and the like.

In other embodiments, an event storm criterion may include events of the same type but received from different managed devices in a terminal.

In other embodiments, an event storm criterion may include events of different types but received from the same managed device in a terminal.

In other embodiments, the management agent 46 may query a managed device 30 for a status of a component within the device 30 once an event storm has been suppressed.

For simplicity of description only six collectors 58 are described above, but in other embodiments additional, or different, collectors may be used, such as an SNMP collector, a software distribution collector, a file document collector (for collecting information from third party devices that output information in a file format, such as XML), and the like.

In other embodiments, the management application 18 may execute on the authorization server 22 instead of on the remote management server 14 (there may be no remote management server 14).

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

The presence of broadening words and phrases such as "one or more," "at least," "but not limited to" or other similar phrases in some instances does not mean, and should not be construed as meaning, that the narrower case is intended or required in instances where such broadening phrases are not used.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive.

The reader's attention is directed to all papers and documents which are filed concurrently with or previous to this specification in connection with this application and which are open to public inspection with this specification, and the contents of all such papers and documents are incorporated herein by reference.

What is claimed is:

1. A method of handling events, the method comprising:
   receiving an event;
   transmitting the event to a remote management application;
   receiving a new event;
   ascertaining if the new event fulfils an event storm criterion;
   suppressing the new event if the new event fulfils the event storm criterion;
   transmitting the new event to the remote management application if the new event does not fulfil the event storm criterion, wherein the new event fulfils the event storm criterion if the new event matches an event received during a defined event storm time period;
   recording a count of a number of matching events that have been suppressed; and
   transmitting an event clear message relating to the matching event, if no matching event is received during a defined normal operation time period;
   wherein the defined normal operation time period comprises a plurality of hours, and wherein the event clear message includes details of the event that was suppressed and the number of occurrences of that event that were suppressed.

2. A method according to claim 1, wherein the event storm time period comprises a defined time prior to the receipt of the new event.

3. A method according to claim 1, wherein the new event fulfils the event storm criterion if the new event matches a defined number of events received during the event storm time period.

4. A method according to claim 1, wherein the method comprises the further step of generating an event indicating that an event storm is being suppressed and transmitting that generated event to the management application.

* * * * *